May 1, 1934.   E. WILDHABER   1,956,817
METHOD OF CUTTING BEVEL AND HYPOID GEARS
Filed Jan. 2, 1932

INVENTOR
Ernest Wildhaber
BY [signature]
his ATTORNEY

Patented May 1, 1934

1,956,817

UNITED STATES PATENT OFFICE 1,956,817

METHOD OF CUTTING BEVEL AND HYPOID GEARS

Ernest Wildhaber, Rochester, N. Y., assignor to Gleason Works, Rochester, N. Y., a corporation of New York Application January 2, 1932, Serial No. 584,418

7 Claims. (Cl. 90—4)

The present invention relates to a method of cutting bevel and hypoid gears and particularly to the cutting of angular bevel and hypoid gears which have a large cone distance compared to their diameters.

The standard method of generating bevel gears is to generate each member conjugate to a crown gear whose axis intersects the axis of the blank in the blank apex, that is, a crown gear which is of the same cone distance as the bevel gear itself and bevel gears regardless of the angle between their axes have heretofore been generated according to this method. For this method of generation, there is required a gear generating machine on which the blank can be mounted at a distance from the center of the cradle corresponding to the cone distance of the blank. Bevel and hypoid gears that are mounted at an acute angle, which is comparatively small, are, however, of relatively small diameter compared to their cone distance. For angular bevel and hypoid gears whose axes intersect at a small angle, then, gear generating machines have heretofore been required, which are so large as to be altogether out of proportion to the size of the gears themselves. The necessity of using large, heavy and costly machines for cutting gears of small size has naturally made the cutting of such gears an expensive process and small angular bevel and hypoid gears have, heretofore, cost a sum altogether out of proportion to their size to produce. This has prevented such gears from coming into extensive use even though there are many drives in which they could be used advantageously and in which by use of a single pair of angular bevels or hypoids, two or more pairs of ordinary right angular bevels or hypoids or spur gears might be supplanted.

The purpose of the present invention is to overcome the objection of the known methods of cutting the gears in question and to permit producing such gears on generating machines whose size is in proportion to the actual size of the gears themselves and not to their large cone distances.

The invention will be described particularly in its application to the generation of spiral bevel gears, but it will be understood that it is applicable to the generation of hypoid gears also.

Figure 1:
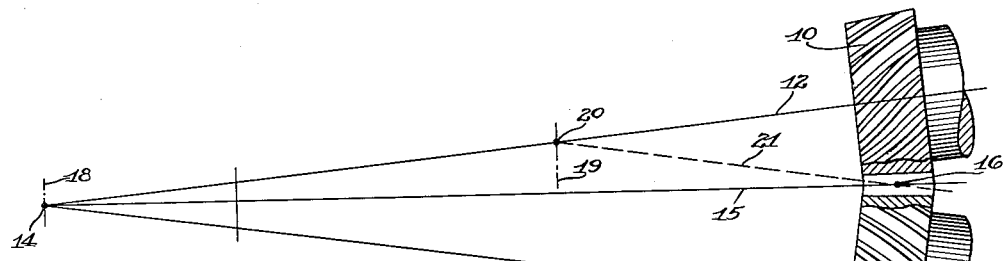
Figure 1 is a side elevation of a pair of angular spiral bevel gears mounted at a small acute angle to one another, the figure showing parts of the teeth broken away to illustrate diagrammatically certain of the features underlying the present invention.

10 and 11 designate, respectively, the two members of a pair of angular spiral bevel gears which are mounted at a relatively small acute angle to one another. The axes 12 and 13 of these gears intersect in their common apex 14. The line 15 is a line common to the pitch surfaces of the two gears and 16 is a mean point on the contacting pitch surfaces of the two gears, that is, a point lying at the center of their face and on their pitch surfaces. The distance from the cone apex 14 to the mean contact point 16 is known as the mean cone distance of the gears.

Heretofore, gears such as the gears 10 and 11 have been generated conjugate to a crown gear having an axis 18 passing through the cone apex 14 of the gears. This has required the use of a generating machine in which the gear blanks, from which the gears 10 and 11 were to be cut, could be mounted at a distance from the axis of the cradle corresponding to the mean cone distance of the gears themselves, for in the generating machine, the axis of the cradle represents the axis of the generating crown gear and the tool represents a tooth of this gear and the tooth surfaces are generated by rolling the tool and blank together as though the blank were rolling with the crown gear. Due to the long cone distance of gears, such as the gears 10 and 11, then, the generating machines required were heretofore disproportionately large as compared with the size of the gears themselves.

If, to avoid the use of large machines, the gears 10 and 11 should be simply generated conjugate to a crown gear of a shorter cone distance, the gears would not be satisfactory. Thus, if for instance, the gear 10 were generated conjugate to a crown gear whose axis 19 intersected the axis 12 of the gear in a point 20, it would be possible to generate the gear 10 on a much smaller machine than that previously required, but the gear would not be usable. During generation, the gear 10 and such a crown gear would roll together in the manner of two bevel gears having a common apex 20 and a common line of contact 21. It is obvious that at the large end of the teeth of the gear 10, the line 21 is much further away from the roots of the teeth of the gear 10, than is the pitch surface 15 of this gear. Consequently, if the gear 10 were simply generated conjugate to a crown gear of shortened cone distance, such as one having its axis at 19, the teeth of the gear 10 would be excessively undercut at their large end and the gear would not be satisfactory.

Figure 2:
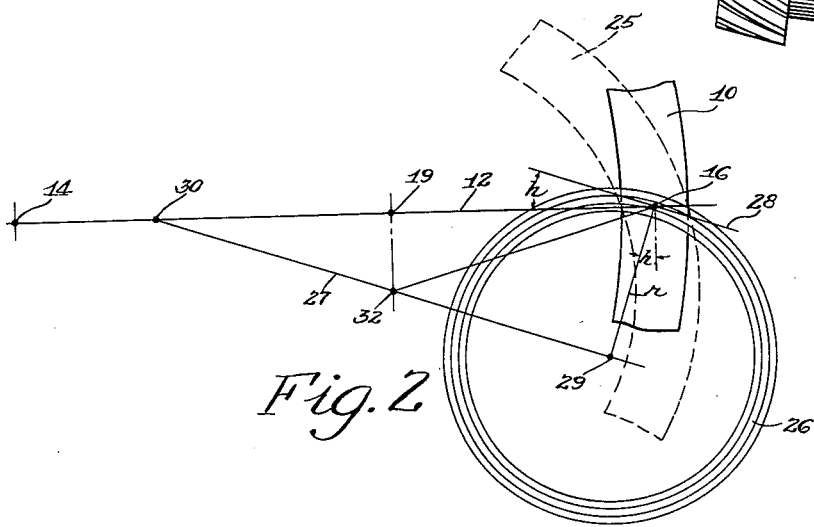
Figure 2 is a diagrammatic plan view illustrating the preferred method of generating these gears according to the present invention.

I have evolved, however, a process for generating gears, such as the gears 10 and 11, conjugate to crown gears of shortened cone distance, which will produce gears having satisfactory tooth shapes. In Figure 2, one of the gears such as the gear 10 is shown in development. Its axis is again indicated at 12 and its apex at 14. Several modifications of my process are possible.

In Figure 2, one way of determining the position of the center of the crown gear 25 to which the gear 10 is to be generated conjugate is shown. 26 designates the cutter employed in generating the gear 10. Preferably this cutter will be a face mill of standard construction but it may be a face-mill hob. The spiral angle $h$ of the gear 10 is then chosen within such limits that a line 27 parallel to the line 28, which is tangent to the tooth curve at the mean point 16, and passing through the center 29 of the cutter 26, intersects the line 12 in a point 30 not far from the true cone apex 14 of the gear. Preferably, the spiral angle is so chosen that the point 30 is spaced from the mean contact point 16 at a distance which is more than two-thirds of the mean cone distance, that is, more than two-thirds of the distance 14—16. In mathematical terms:

$$(30-16) = \frac{r}{\sin h} > \frac{2}{3}(14-16),$$

or $$\sin h < \frac{1.5r}{14-16},$$

where $r$ is the radius of the cutter 26, that is, is equal to the distance 29—16.

The center 32 of the crown gear represented by the gear generator is then placed on the line 27 at a point 32, at a maximum distance from the center 29 of the cutter which is obtainable with the adjustment provided on the gear generator available for cutting the gears.

Figure 2 illustrates a position at the center of the roll. In this means position, contact between the crown gear, represented by the cutter 26, and a tooth surface of the gear 10 takes place along a line which passes through the mean point 16. In this mean position, the line of contact between the gear 10 and the crown gear depends solely on the instantaneous relative motion of the cutter center 29 with respect to the gear 10. This instantaneous relative motion is the same for all crown gears having an axis 32 positioned anywhere on the line 27 and it is, therefore, the same as for a crown gear positioned relative to the blank so that its axis passes through the point 30, which lies both on the line 27 and on the axis 12 of the gear 10.

Now, since the point 30 is close to the apex 14, the line of contact at the mean rolling position between the gear 10 and the crown gear, whose center lies on the line 27, will nearly coincide with the line of contact between the gear 10 and its mate 11 in a corresponding mean position of the roll of the tooth surfaces of these two gears. Since, the latter line of contact is identical with the line of contact at the center of the roll between the gear 10 and the tooth surface of a generating crown gear whose center is at 14, it will be seen that undercut of the tooth surfaces is avoided when the gears are generated conjugate to a crown gear whose axis is at 32 and at the same time, it is possible to cut the gears on a small machine.

When the two gears 10 and 11 are generated conjugate to complementary crown gears whose centers are at 32, the gears are bound to transmit uniform motion as is already known. Mathematically speaking, however, they mesh only with point contact and they do not bear on their entire tooth surfaces. In other words, when the gears 10 and 11 are generated conjugate to complementary and coaxial crown gears, they are not fully conjugate to one another. The departure from line contact is, however, very slight where the lines of contact between the gears and the crown gears used for their generation nearly coincide with the line of contact between the gears themselves. Moreover, if such departure from full line contact is more than is desired for purposes of obtaining adjustability in the gears themselves, it can be reduced or eliminated by using cutters of slightly different diameter in cutting the two sides of the teeth of one of the gears.

It has been found that the departure from line contact is wholly negligible when the distance between the points 14 and 30 is small as compared with the mean cone distance 14—16, but that the departure increases at a rapid rate as the distance between the point 30 and the apex 14 increases. Thus the departure from line contact is four times as pronounced when the distance 14—30 is doubled. Where this distance is kept small, it is usually unnecessary to lengthen the areas of tooth contact by the use of cutters of different diameters in cutting the two members of a pair.

It is to be noted that with the present method of cutting, a crown gear is used whose axis 32 is offset from the axis 12 or 13 of the spiral bevel gear to be generated. This means that to generate spiral bevel gears by the method of the present invention, a hypoid gear generator must be used, namely, a gear generator in which the axis of the work spindle can be offset from the axis of the cradle. With the present invention, however, the hypoid generator used can be of much smaller size than the bevel generator required with the hitherto known and practiced method of generating gears such as the gears 10 and 11.

Ordinarily the gears will be cut with standard cutters as in the usual practice of cutting bevel gears. However, it is to be understood that the gears may be cut with complementary cutters containing, if so desired, both outside and inside cutting edges. Likewise they may be cut with identical cutters or with similar cutters containing both outside and inside cutting edges adjusted so as to cut simultaneously.

Figure 3:
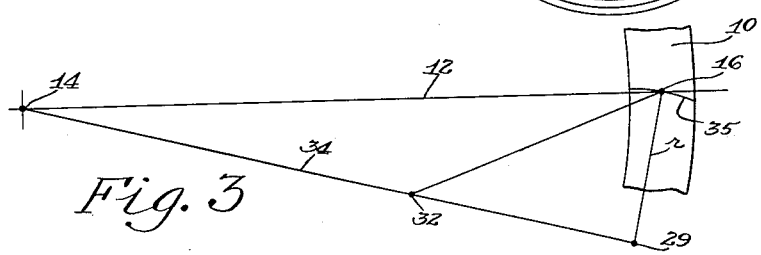
Figure 3 shows diagrammatically one modification of the present invention.

Figure 3 illustrates diagrammatically a slight modification of the present invention. Here the line 34 connecting the cutter center 29 and the center 32 of the generating crown gear passes exactly through the apex 14 of the bevel gear 10. This method produces tooth surfaces more nearly approximating those generated with a crown gear whose apex is at 14, but for the same cone distance between the center 32 of the crown gear and the mean contact point 16, as in the method of Figure 2, the tooth surfaces 35 cut will have a smaller spiral angle.

Figure 4:
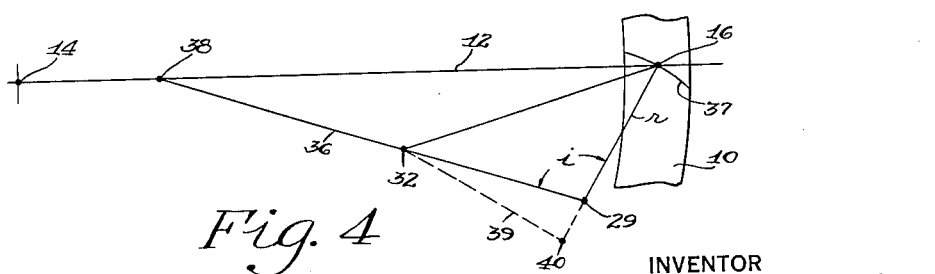
Figure 4 shows diagrammatically a still further modification.

Figure 4 illustrates a still further modification of the present invention. Here the line 36 connecting the cutter center 29 and the crown gear center 32 is not perpendicular to the cutter radius, that is, is not parallel to a tangent to the tooth curve 37, but is inclined at an obtuse angle $i$ to the line 16—29. The line 36 intersects the gear axis 12 in the point 38. By positioning the crown gear center 32 on the line 36, tooth curves of higher spiral angle can be cut on the gear 10 than when the crown gear center is chosen according to the constructions diagrammatically illustrated in Figures 2 and 3. The dotted line 39 indicates the position of a perpendicular to the cutter radius 16—29.

In all these cases, the conditions are so chosen that the line 27, 34 or 36, as the case may be intersects the axis 12 at such a point that the line of contact between the crown gear centered at 32 and a gear 10 or 11, at a mean point in the roll, is not inclined much to the line of contact between the two gears 10 and 11. In this manner, fully correct gears of large cone distance 14—16 may be generated conjugate to a crown gear of much smaller cone distance 32—16.

To generate angular hypoid gears of long cone distance according to this invention, the same principles regarding selection of the crown gear center are followed as have been described with reference to the selection of the position of the crown gear center in cutting spiral bevels.

Angular spiral bevel gears and hypoid gears formed according to the method of this invention are conjugate to crown gears of reduced cone distance having conical tooth surfaces or broadly tooth surfaces which are portions of surfaces of revolution. Moreover, the center of such a tooth surface is located substantially at the normal projection 29 of the crown gear center 32 to the tooth normal $r$ at the mean contact point 16, or lies between said projection 40 (Fig. 4) and the mean contact point 16.

It is to be understood that the gears cut according to the present invention may be provided with teeth of tapering depth, if so desired, by using the customary corrections and changes.

In general it may be said, that while the present invention has been described in connection with particular embodiments, this application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of generating the tooth surfaces of a tapered gear of relatively long cone distance which comprises rotating a face mill gear cutter in engagement with a tapered gear blank while rotating the gear blank on its axis and simultaneously producing a relative motion between the tool and blank about an axis offset from and angularly disposed to the blank axis and lying on a line which is parallel to a tangent to the lengthwise tooth curve of the blank at a mean point of the blank and which passes through the center of the cutter and intersects the axis of the blank in the cone apex.

2. The method of producing a tapered gear, which comprises generating said gear conjugate to a crown gear having an axis offset from the axis of said gear and having curved teeth, the center of curvature of said teeth being disposed on the mean tooth normal substantially at the projection of the crown gear center to said normal.

3. The method of producing a tapered gear, which comprises generating said gear conjugate to a crown gear having an axis offset from the axis of said gear and having curved teeth, the center of curvature of said teeth being disposed on the mean tooth normal between the teeth and the projection of the crown gear axis to said tooth normal.

4. The method of generating the tooth surfaces of a tapered gear of relatively long cone distance which comprises rotating a face mill gear cutter in engagement with a tapered gear blank while rotating the blank on its axis and simultaneously producing a relative rolling motion between the tool and blank about an axis offset from the blank axis and lying on a line which intersects the blank axis at a point between the blank apex and a mean point of the face of the blank and which is also parallel to a tangent to the lengthwise tooth curve at said mean point.

5. The method of generating the tooth surfaces of a tapered gear of relatively long cone distance which comprises rotating a face mill gear cutter in engagement with a tapered gear blank while rotating the blank on its axis and simultaneously producing a relative rolling motion between the tool and the blank about an axis offset from the blank axis and lying on a line which intersects the blank axis at a point between the blank apex and a mean point of the face of the blank and spaced from the blank apex less than one third of the mean cone distance of the blank and which is also parallel to a tangent to the lengthwise tooth curve at said mean point.

6. The method of generating the tooth surfaces of a tapered gear of relatively long cone distance which comprises rotating a face mill gear cutter in engagement with a tapered gear blank while rotating the blank on its axis and simultaneously producing a relative rolling motion between the tool and blank about an axis offset from the blank axis and lying on a line which is parallel to a tangent to the lengthwise tooth curve of the blank at a mean point of the face of the blank and which passes through the center of the cutter and which intersects the blank axis at a point between the blank apex and the said mean point.

7. The method of generating the tooth surfaces of a tapered gear of relatively long cone distance which comprises rotating a face mill gear cutter in engagement with a tapered gear blank while rotating the blank on its axis and simultaneously producing a relative rolling motion between the tool and blank about an axis offset from the blank axis and lying on a line which is parallel to a tangent to the lengthwise tooth curve of the blank at a mean point of the face of the blank and which passes through the center of the cutter and which intersects the blank axis at a point spaced from the blank apex a distance less than one-third of the mean cone distance of the blank.

ERNEST WILDHABER.